United States Patent [19]

Charvet

[11] Patent Number: 4,709,544
[45] Date of Patent: Dec. 1, 1987

[54] REINFORCEMENT ASSEMBLY HAVING A LAYER COMPRISING A SHAPED THREAD: ARTICLES COMPRISING SUCH ASSEMBLIES

[75] Inventor: Jean-Louis Charvet, Clermont-Ferrand, France

[73] Assignee: Compagnie Generale des Etablissements Michelin, Clermont-Ferrand, France

[21] Appl. No.: 854,432

[22] Filed: Apr. 21, 1986

[30] Foreign Application Priority Data

Apr. 29, 1985 [FR] France ................. 85 06874

[51] Int. Cl.[4] .................. D02G 3/48; B60C 9/00
[52] U.S. Cl. .................. 57/218; 57/212; 57/213; 57/214; 57/215; 57/219; 57/236; 57/902; 152/451; 152/527; 152/556
[58] Field of Search ............... 57/212–223, 57/902, 236, 238; 152/451, 527, 556

[56] References Cited

U.S. PATENT DOCUMENTS

| 401,112 | 4/1889 | Batchelor et al. | 57/219 |
| 586,706 | 7/1897 | Frederick | 57/219 |
| 986,817 | 3/1911 | Gore | 57/219 |
| 1,405,837 | 2/1922 | Green | 57/220 |
| 2,241,955 | 5/1941 | Noyer et al. | 57/214 |
| 3,402,546 | 9/1968 | Peene | 57/236 |
| 4,349,063 | 9/1982 | Kikuchi et al. | 57/902 X |
| 4,506,500 | 3/1985 | Miyauchi et al. | 57/212 |
| 4,544,603 | 10/1985 | Richards | 57/902 X |

FOREIGN PATENT DOCUMENTS

| 654919 | 11/1964 | Belgium . |
| 654921 | 11/1964 | Belgium . |
| 654923 | 11/1964 | Belgium . |
| 655591 | 11/1964 | Belgium . |
| 865538 | 5/1941 | France . |
| 2453933 | 11/1980 | France . |
| 2505372 | 11/1982 | France . |
| 2546922 | 12/1984 | France . |
| 1183215 | 3/1970 | United Kingdom . |

Primary Examiner—John Petrakes
Attorney, Agent, or Firm—Brumbaugh, Graves, Donohue & Raymond

[57] ABSTRACT

A reinforcement assembly comprises from one to three layers of threads, one of which is a central layer having one or more shaped threads, i.e., threads having a center of gravity and a contour in an intersecting plane perpendicular to the longitudinal direction of the thread, the distance from any point on the contour to the center of gravity depending on the position of the point on the contour. The twist pitch of each shaped thread is different from the winding pitch of the shaped thread in the layer in which it is located and if the element comprises three layers, the winding pitch of the outer layer is different from the winding pitch of the subjacent layer. Reinforced articles include such assemblies impregnated with a material, in particular pneumatic tires.

15 Claims, 11 Drawing Figures

REINFORCEMENT ASSEMBLY HAVING A LAYER COMPRISING A SHAPED THREAD: ARTICLES COMPRISING SUCH ASSEMBLIES

BACKGROUND OF THE INVENTION

The present invention relates to assemblies for reinforcing materials, and more particularly assemblies intended to reinforce plastics or rubbers.

Assemblies of this general character are used to reinforce manufactured articles such as belts, tubes, plies and pneumatic tires, for example. When such assemblies are being incorporated in articles, it is important that they be entirely impregnated by a material, usually the material which they are to reinforce, and that the material penetrate into all voids in the assemblies. If penetration is incomplete, empty channels are likely to be formed along the assemblies through which corrosive agents such as water, for example, penetrating the article, perhaps as a result of cuts therein, can travel causing deterioration of the assemblies and leading to eventual deterioration of the article itself.

Various assemblies of round threads have been proposed heretofore in an attempt to secure good penetration of impregnating material into any voids between the threads. Typical assemblies of this kind are described, for example, in the patents or patent applications published under the following numbers: France Nos. 2 453 933, 2 505 372, 2,546,922, U.S. Pat. Nos. 2,900,784, 3,273,978, 4,506,500, Belgian Nos. 654 921, and 654 923. Such assemblies are either costly to manufacture because of their complexity, or are subject to incomplete penetration by the impregnating material, so that the risks of deterioration remain.

Belgian patent No. 655 591 describes a cable formed of round threads having a core surrounded by a layer formed alternately of single threads and strands. The diameter of these single threads or strands is made the same as that of the core in order better to regulate the rigidity and fatigue strength. This cable also suffers from incomplete penetration of the rubber which it is intended to reinforce and its manufacture is complicated.

Flat threads or ribbons have also been proposed for reinforcing rubber articles, such threads or ribbons being used either alone, or as core or twisted together, as described, for example, in GB Pat. No. 1 183 215, U.S. Pat. No. 3,402,546, BE Pat. No. 654 919 and FR Pat. No. 865 538. Such reinforcements are expensive to produce and/or do not afford the possibility of definitely avoiding corrosion problems due to incomplete penetration of the rubber.

It is an object of the present invention, therefore, to provide a reinforcement assembly which is economical to produce and which permits total impregnation by a material, for instance by the material which it is intended to reinforce.

BRIEF SUMMARY OF THE INVENTION

A reinforcement assembly according to the invention comprises, at least in part, an element the characteristics of which are as follows:

(a) it has at least one layer and at most three layers of threads;

(b) at least one layer, known as the "shaped thread layer," is formed, at least in part, of a round thread and a shaped thread (i.e., a thread having a section perpendicular to its longitudinal axis that has a center of gravity and a contour, the distance from a point on the latter to the center of gravity varying depending on the position of the point on the contour);

(c) the twist pitch of each shaped thread is different from the winding pitch of the shaped thread in the layer in which it is located;

(d) if the element comprises more than one layer, at least the central layer is a shaped thread layer;

(e) if the element comprises three layers, the winding pitch of the outer layer is different from the winding pitch of the subjacent layer;

(f) if the element comprises one or two layers without shaped threads, these layers are unsaturated (i.e., there is at least one space between two adjacent round threads).

The invention also contemplates a reinforcement assembly as defined above when impregnated with a material filling all the spaces between the threads, as well as articles comprising at least one reinforcement assembly according to the invention.

The examples described below and shown in the diagrammatic figures of the accompanying drawings are intended to illustrate the invention and facilitate an understanding thereof without, however, limiting the scope.

IN THE DRAWINGS

FIG. 1 is a schematic diagram in transverse section of a reinforcement assembly according to the invention formed of a single element comprising a shaped thread;

FIGS. 2 and 3 each show enlarged representations of transverse sections through the shaped thread of the reinforcement assembly shown in FIG. 1;

FIGS. 8, 9, 10 and 11 each show in transverse section a different reinforcement assembly according to the invention.

DESCRIPTION OF PREFERRED EMBODIMENTS

Figure 1:
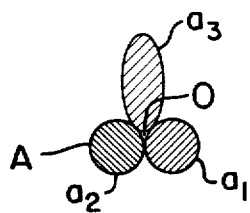

Referring to FIG. 1, a reinforcement assembly 100 in accordance with the invention comprises a single element formed by a single layer of threads. The layer A, known as a "shaped thread layer," is formed of three threads, two round threads $a_1$, $a_2$ and a shaped thread $a_3$. These three threads wind around the longitudinal axis of the element which axis is designated by the letter O in FIG. 1.

The threads $a_1$, $a_2$ are round, that is to say, the section of each thread along a plane perpendicular to the longitudinal axis of the thread is a circle. By definition, a shaped thread is a thread which has the following properties: The transverse section obtained when it is cut by any plane perpendicular to the longitudinal direction of the shaped thread has a center of gravity and a contour, and the distance from a point on the contour to the center of gravity varies depending on the position of the point on the contour.

Figures 2, 3:
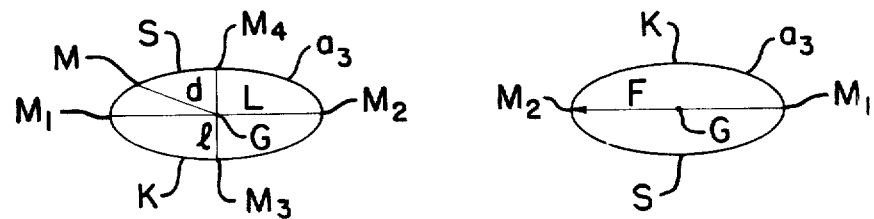

By way of example, the transverse section, previously defined, of the shaped thread $a_3$ is represented by the curve S shown in FIG. 2. The section S has a center of gravity G and a contour K. The distance "d" between any point M on the contour K and the center of gravity G varies depending on the position of the point M on the contour K. The section S has, for instance, an oval shape with two extreme dimensions, a maximum dimension L and a minimum dimension "l". The maximum dimension L corresponds to the length of the line $M_1M_2$ joining the elongated ends $M_1$, $M_2$ of the section S, and the minimum dimension "l" corresponds to the length of the lines $M_3M_4$ joining the ends $M_3$, $M_4$ of the section S which are closest together, the lines $M_1M_2$, $M_3M_4$ both passing through the center of gravity G.

The axis of the shaped thread $a_3$ is defined by all of the centers of gravity G when the section S is moved along the thread $a_3$ and is therefore diagrammatically indicated by the letter G in FIG. 2. The axis G is parallel at every point to the longitudinal direction of the shaped thread even when said axis and said direction are not rectilinear.

The winding pitch of the threads $a_1$, $a_2$, $a_3$ of the layer A is designated $P_A$ and it represents the winding pitch of the threads $a_1$, $a_2$, $a_3$ around the axis O. This pitch is an algebric number; it is positive when the winding is effected in a direction which is selected arbitrarily as positive, for instance a Z winding (right twist), and negative in the opposite case. The absolute value of the pitch, designated as $|P_A|$, is the length of the winding pitch of the threads $a_1$, $a_2$, $a_3$ around the axis O, that is to say, the length of the pitch $P_A$. The pitch $P_A$ is the same for the three threads $a_1$, $a_2$, $a_3$, which are therefore wound around the axis O with the same pitch length and in the same direction, $|P_A|$ being measured along the longitudinal axis O which is assumed rectilinear.

The length of the twist pitch of the shaped thread $a_3$ is the distance, measured along the axis of the shaped thread $a_3$, which corresponds to the rotation by one revolution of the section S of the shaped thread $a_3$ around its axis. In the section S of the shaped thread $a_3$ shown in FIG. 3, the arrow F connects the two elongated ends $M_1$, $M_2$ of the shaped thread $a_3$, and is directed from the end $M_1$ towards the end $M_2$, passing through the axis of the thread $a_3$ as represented by the center of gravity G. At a distance from the position shown in FIG. 3, measured along the axis of the shaped thread $a_3$ and equal to the length of the twist pitch, the arrow F effects a rotation of one revolution around the axis. The twist pitch $Pa_3$ of the shaped thread $a_3$ is an algebric number, being positive when the twist (i.e., the rotation of the arrow F) takes place in the direction which has been selected arbitrarily as positive, and being negative in the opposite case.

The absolute value of the twist pitch $Pa_3$ is indicated as $|Pa_2|$ and it corresponds to the length of the twist pitch $Pa_3$. The winding pitch lengths and the twist pitch lengths corresponding to the same assembly are expressed in the same unit, for instance the millimeter, throughout the present description.

Figure 4:
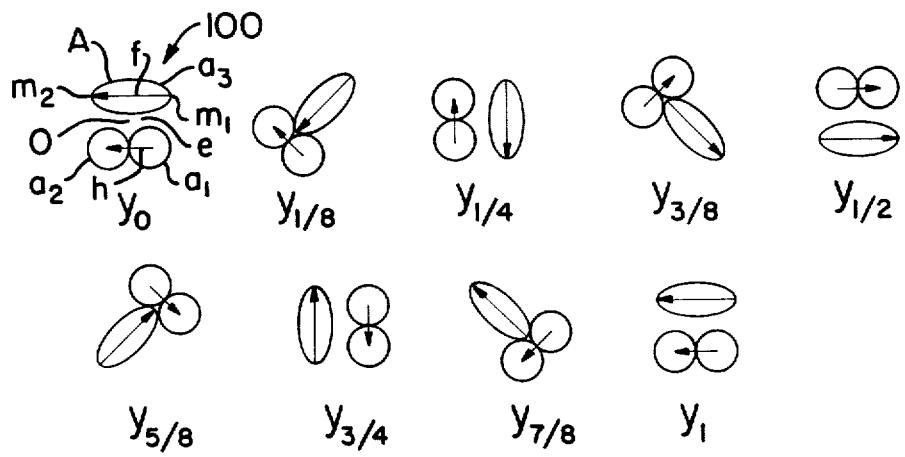
FIG. 4 shows a series of representations of longitudinally spaced transverse sections through the reinforcement assembly shown in FIG. 1.

FIG. 4 shows a series of representations of nine sections through the assembly 100, taken at different longitudinal positions therealong. Each of the sections is taken along a plane perpendicular to the axis of the element which axis is assumed to be rectilinear. Each of these sections is indicated by the letter Y followed by a number. The original section is designated $Y_O$ and each of the other sections is designated by the letter Y followed by a whole or fractional number which represents the ratio between, on the one hand, the distance between this section and the section $Y_O$ and, on the other hand, the lenght of the winding pitch of the threads $a_1$, $a_2$, $a_3$ around the axis, that is to say, the length $|P_A|$ of the pitch $P_A$.

Figure 5:
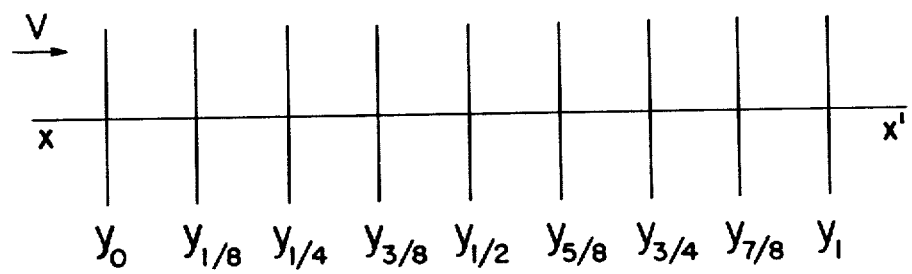
FIG. 5 is a graph showing the locations of the sections of FIG. 4 with respect to the longitudinal axis of the element shown in FIG. 1.

FIG. 5 is a graph showing the axis xx', assumed linear, of the element and the locations of the nine sections $Y_0$, $Y_{1/8}$, $Y_{1/4}$, $Y_{3/8}$, $Y_{1/2}$, $Y_{5/8}$, $Y_{3/4}$, $Y_{7/8}$, $Y_1$ of FIG. 4 therealong. All the sections of FIG. 4 are taken looking in the same direction, which is the direction of the arrow V (FIG. 5), and the number which follows the letter Y increases in the direction of the arrow V.

By way of example, the distance between the sections $Y_1$ and $Y_0$ is equal to the length $|P_A|$. For reference purposes, an arrow f has been placed on each section of the shaped thread $a_3$, joining the two elongated ends $m_1$, $m_2$ of the shaped thread $a_3$, and being directed from the end $m_1$ towards the end $m_2$. Similarly, an arrow h has been placed on each section of the assembly of the round threads $a_1$, $a_2$ joining the centers of the circles $a_1$, $a_2$ of said section, and directed from the center corresponding to the thread $a_1$ to the center corresponding to the thread $a_2$.

In accordance with the invention, the pitches $P_A$ and $Pa_3$ are different. These pitches are, for instance, related by the equation $P_A = -Pa_3$, that is to say, the twist is in the direction opposite the winding of the threads $a_1$, $a_2$, $a_3$, the length $|P_A|$ of the winding pitch being equal to the length $|Pa_3|$ of the twist pitch.

This pitch difference allows the intermittent formation of spaces between the threads $a_1$, $a_2$ on the one hand and the thread $a_3$ on the other hand, which permits good migration of impregnating material throughout the assembly 100, with the advantages which result therefrom. One such space "e" is shown in the section $Y_O$ of FIG. 4.

Figure 6:
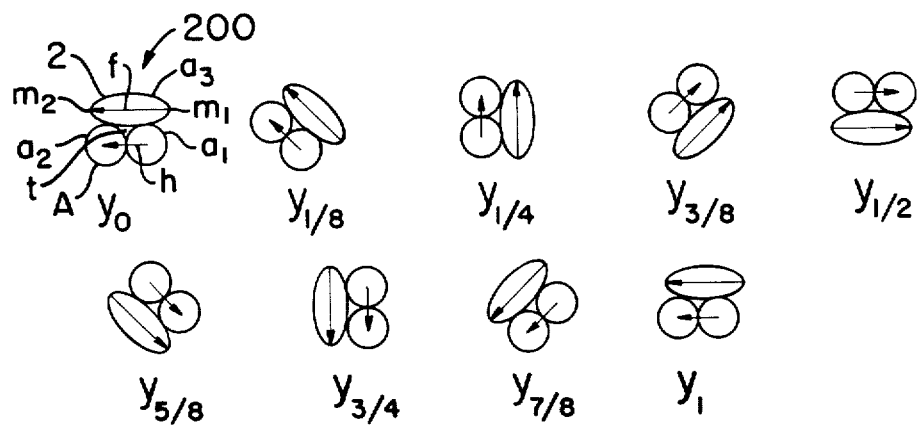
FIG. 6 shows a series of representations of longitudinally spaced transverse sections through a reinforcement assembly which is not in accord with the invention.

By way of comparison, FIG. 6 shows the same sections $Y_0$, $Y_{1/8}$, $Y_{1/4}$, $Y_{3/8}$, $Y_{1/2}$, $Y_{5/8}$, $Y_{3/4}$, $Y_{7/8}$, $Y_1$ for an assembly 200 which is not in accordance with the invention and which is formed of a single element identical to the element of FIG. 1 but with the difference that the pitches are the same, i.e. $P_A = Pa_3$.

From FIG. 6 it can be seen that the threads $a_1$, $a_2$, $a_3$ are always in contact with each other. Therefore, a channel t is formed between the three threads $a_1$, $a_2$, $a_3$. Impregnating material cannot penetrate into the channel t so that it remains empty after impregnation of the assembly 200. The channel t is therefore capable of subsequently permitting the migration of corrosive agents, for instance water, along the assembly 200, with the drawbacks which result therefrom, in particular the risks of corrosion.

Figure 7:
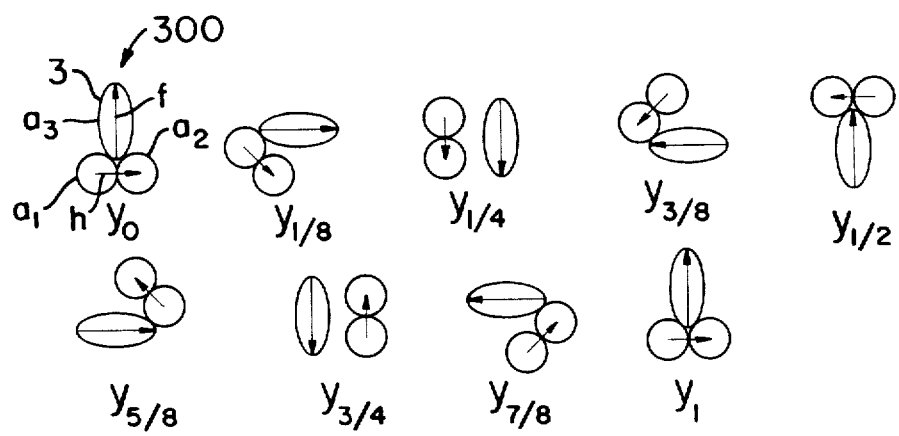
FIG. 7 shows a series of representations of longitudinally spaced transverse sections through another reinforcement assembly in accordance with the invention.

FIG. 7 shows another assembly 300 in accordance with the invention, formed of a single element, FIG. 7 being a series of nine sections $Y_0$, $Y_{1/8}$, $Y_{1/4}$, $Y_{3/8}$, $Y_{1/2}$, $Y_{5/8}$, $Y_{3/4}$, $Y_{7/8}$, $Y_1$, taken as in FIG. 4. The element in FIG. 7 is identical to the element shown in FIG. 4, with the difference that $P_A = 2Pa_3$, that is to say, the direction of twist of the shaped thread $a_3$ is the same as the direction of winding of the threads $a_1$, $a_2$, $a_3$ in the layer A but the length $|P_A|$ of the winding pitch of the layer A is twice the length of the twist pitch of the shaped thread $a_3$.

For clarity in the drawing, the reference characters corresponding to the assemblies 100, 200, 300 have been applied only to the sections $Y_0$ of FIGS. 4, 6, 7.

Figure 8:
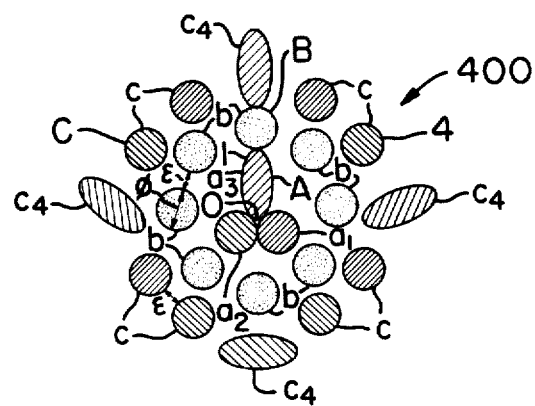

FIG. 8 shows in section another assembly according to the invention. This assembly 400 is formed of a single element which has a core identical to the element shown in FIGS. 1 and 4. Around the central layer A formed by this core there are a layer B of eight round threads b, said layer B being without shaped thread, and an outer layer C arranged around the layer B, said outer layer C being formed of eight round threads c and four shaped threads $c_4$. The pitch $P_B$ of the layer B and the pitch $P_C$ of the layer C are defined in a manner similar to what has been stated previously with respect to the layer A. Each of these layers is wound around the axis of the element represented by the point 0 in FIG. 8, the section of FIG. 8 being perpendicular to this axis. The winding pitch $P_C$ of the outer layer C is different from the winding pitch $P_B$ of the subjacent layer B in order to avoid the entangling of the threads of the layer B with the threads of the layer C, since such entanglement leads to the formation of channels which can favor corrosion. In the assembly 400, the layers A and C are shaped thread layers.

The intermediate layer B is an unsaturated layer, that is to say, by definition, there is at least one space $\epsilon$ between two neighboring threads among the threads b, several of which threads b may be possibly in contact with each other. The outer layer C is formed alternately of a shaped thread $c_4$ and of two round threads c. This layer C has been shown unsaturated, that is to say, there is at least one space $\epsilon$ between two adjacent round threads c, but it could be saturated, all the adjacent round threads c then having continuous contact with each other.

In accordance with the invention, the twist pitch $Pc_4$ of each shaped thread $c_4$ is different from the winding pitch $P_c$ of the layer C. The presence of the shaped threads $c_4$ together with the fact that the twist pitch of these threads is different from the winding pitch of the layer C permits the impregnating material to pass through the layer C and fill up all the spaces within the assembly 400. This is attributable to the difference in winding pitch between the outer layer C and the subjacent layer B, the unsaturation of the intermediate layer B and the structure of the core, as previously described.

Figure 9:
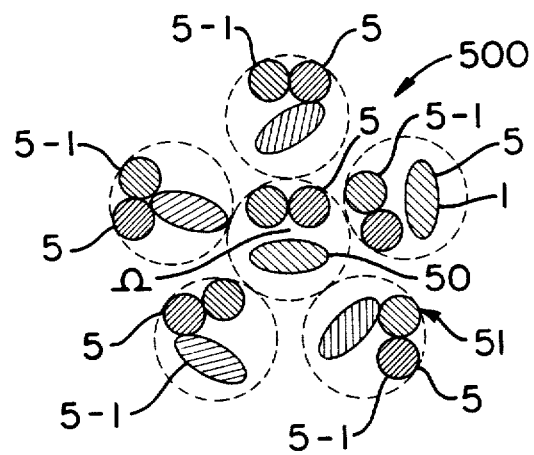

FIG. 9 shows, in section, another assembly 500 in accordance with the invention, formed of six identical strands 5, each being an element as previously described and shown in FIGS. 1 and 4. The envelope of each of these strands 5 is represented by a dashed-line circle in FIG. 9. The strands 5 are so arranged that the strand 50 constitutes a core, while the other five strands 5-1 constitute a layer 51 of strands 5-1 wound in the same direction around the axis of the assembly 500. The section shown in FIG. 9 is taken perpendicular to the axis $\Omega$ of the assembly 500.

Figures 10, 11:
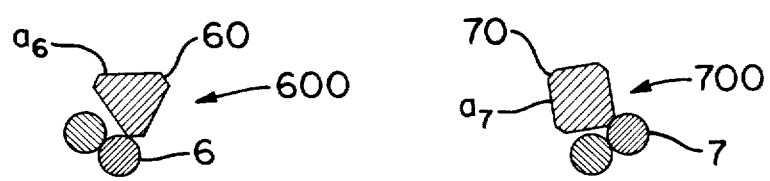

The invention is not limited to assemblies the shaped threads of which are of oval section. By way of example, FIGS. 10 and 11 each shows an assembly according to the invention which embodies a shaped thread different from the shaped threads described above. The assembly 600 according to the invention shown in FIG. 10 is formed of a single element identical to the element utilized in FIGS. 1 and 4, with the difference that the shaped thread $a_6$ thereof has a practically triangular section. The assembly 700 shown in FIG. 11 is formed of a single element having a shaped thread $a_7$ substantially rectangular in transverse section. Preferably, the corners 60 of the shaped thread $a_6$ and the corners 70 of the shaped thread $a_7$ are beveled as shown in Figs. 10, 11, in order to avoid excessive stresses in the material covering the assemblies 600, 700.

The sections of FIGS. 1, 4, 6 to 8, 10 and 11 are each taken through a plane perpendicular to the axis of the element.

The assemblies in accordance with the invention may each comprise several shaped threads of different section, arranged, for example, in the same layer. Preferably, at least a part of the threads constituting the assemblies described above are metallic.

In an assembly in accordance with the invention, at least one layer may, if desired, contain two or more than two adjacent shaped threads, the twist pitch of each of the shaped threads of this layer being preferably different from the twist pitch of the other shaped threads which are adjacent to it in this layer, while being also different from the winding pitch of this shaped thread in this layer.

Preferably, for each shaped thread of an assembly according to the invention, in every section perpendicular to the longitudinal direction of the shaped thread, the ratio between the maximum dimension L and the minimum dimension l should be greater than 1.1.

The assemblies according to the invention may advantageously be used in the crown of pneumatic tires in the form of reinforcement plies, for example, the assemblies of each ply being in particular parallel to each other and generally crossed with the assemblies of one or more other plies.

In the case of a rubber article such as a pneumatic tire, for example, the invention eliminates the necessity for preimpregnation of the reinforcement assemblies before their incorporation in the article which they are to reinforce, since it facilitates complete migration of the impregnating material into the assemblies in molding and/or curing the article.

In a typical example, an assembly according to the invention may be formed entirely of two layers of threads, all of steel, arranged as follows:

- a central layer A serving as core, similar to the element described above, the layer A being formed of two round wires 0.350 mm in diameter and a shaped wire similar in section to the shaped wire $a_3$ shown in FIG. 2, with the values L=0.390 mm and l=0.290 mm, i.e., the relationship L/l=1.34; the three wires of the layer A are wound towards the left (S-direction) with a length of pitch of 10 mm; the twisting of the shaped wire is effected towards the left (S-direction) and therefore in the same direction as the winding of the wires of the layer A, but with a pitch length of 7 mm (i.e., the twist pitch of the shaped wire is different from the winding pitch in the layer A);
- an unsaturated outer layer B surrounding the layer A, formed of eight round wires 0.350 mm in diameter, wound towards the left with a pitch length of 15 mm.

The invention thus provides reinforcement assemblies that can be impregnated practically perfectly by materials such as rubber, for example, without the formation of voids into which corrosive agents might be able to migrate. Such assemblies are characterized by very good resistance to corrosion, and therefore are of particular utility for reinforcing the crowns of pneumatic tires in which they are incorporated.

In order to permit good impregnation by the impregnating material, the number of layers should in assemblies according to the invention be at most equal to 3.

In assemblies in accordance with the invention, desirably certain ratios obtain as follows:

(a) In each shaped thread layer, the number of shaped threads is at most equal to 2N/3, N being the total number of threads in the layer in question (that is to say, the total number of round threads plus shaped threads). This relation favors a homogeneous distribution of the stresses in the assembly and decreases the cost. Also, the number of shaped threads in each shaped thread layer is advantageously at most equal to N/2.

(b) When an assembly according to the invention comprises at least one unsaturated layer without a shaped thread, the ratio $\epsilon/\phi$ is at least equal to 0.06 in each such layer, $\epsilon$ being the space between two adjacent threads, $\phi$ being the diameter of the threads in the layer, which is assumed to be the same for all of the threads, the spaces being assumed to be distributed uniformly among all the threads of the layer, i.e., the value $\epsilon$ of the ratio represents an average space. Such an average space $\epsilon$ and the diameter $\phi$ are shown in FIG. 8 for the unsaturated layer B of the assembly 400.

(c) When, in a shaped thread layer, the twist of the shaped thread is in the same direction as the winding of the shaped thread in the layer, the ratio $$\frac{\text{(length of twist pitch)} - \text{(length of winding pitch)}}{\text{(length of winding pitch)}}$$

is, for this shaped thread, at least equal to 0.2 in absolute value.

The assemblies according to the invention can be produced with known equipment and by known methods. It will not be necessary, therefore, to describe such equipment and methods in detail herein. For example, the shaped threads may be produced by crushing a round thread, which crushing can be effected, in particular, with rollers.

Of course, the invention is not to be limited to the specific embodiments described above but is susceptible of modification in form and detail within the skill of the art. For example, assemblies according to the invention may incorporate components such as a wrap and/or a core formed entirely of a shaped thread, the twist pitch of said core being then different from the winding pitch of the threads of the layer surrounding said core and closest to said core. The invention is intended to encompass all such modifications falling within the scope of the following claims.

I claim:

1. A reinforcement assembly comprising
   an element having at least one layer and at most three layers of threads wound together;
   at least one layer, known as a "shaped thread layer", being formed, at least in part, of a round thread and a shaped thread;
   the twist pitch of each shaped thread being different from the winding pitch of this shaped thread in the shaped thread layer in which it is located;
   this difference of pitches being obtained in the following manner, for each shaped thread:
   either the twist of said shaped thread is in the direction opposite the winding of said shaped thread in the shoped thread layer;
   or the twist of said shaped thread is in the same direction as the winding of said shaped thread in the shaped thread layer, and the ratio $$\frac{\text{(length of twist pitch)} - \text{(length of winding pitch)}}{\text{(length of winding pitch)}}$$

for said shaped thread is at least equal to 0.2 in absolute value.

2. A reinforcement assembly as in claim 1 in which said element has at least two layers and at most three layers of thread wound together, one of which layers is central to the other(s), said central layer being a shaped thread layer.

3. A reinforcement assembly as in claim 1 in which said element has three layers, including an outer layer and a subjacent layer, and the winding pitch of the threads in the outer layer is different from the winding pitch of the threads in the subjacent layer.

4. A reinforcement assembly as in claim 2 or 3 having one or two layers other than shaped thread layers, said layer(s) without shaped thread being unsaturated, said unsaturation consisting of at least one space between two adjacent round threads.

5. A reinforcement assembly as in claim 4 in which in each unsaturated layer without shaped thread the ratio $\epsilon/\phi$ is at least equal to 0.06, where $\epsilon$ is the average space between two adjacent threads and $\phi$ is the diameter of the threads of said layer.

6. A reinforcement assembly as in claim 1 with at least two shaped threads adjacent in said one shaped thread layer, the twist pitch of each of said at least two adjacent shaped threads being different from the twist pitch of any other shaped thread which is adjacent to it in said layer.

7. A reinforcement assembly as in claim 1 in which the section of the shaped thread taken along any plane perpendicular to the longitudinal direction of the shaped thread has maximum and minimum dimensions and the ratio of the maximum dimension to the minimum dimension is greater than 1.1.

8. A reinforcement assembly as in claim 1 in which the number of shaped threads in each shaped thread layer is at most equal to 2N/3, where N is the total number of threads in said shaped thread layer.

9. A reinforcement assembly as in claim 8 in which the number of shaped threads in each shaped thread layer is at most equal to N/2.

10. A reinforcement assembly as in claim 1 which comprises a wrap.

11. A reinforcement assembly as in claim 1 in which said element has at least two layers and at most three layers of threads wound together, one of which layers is central to the other(s), said central layer being a core formed entirely of a shaped thread, the twist pitch of said core being different from the winding pitch of the threads of the layer surrounding and closest to said core.

12. A reinforcement assembly as in claim 1 impregnated with a material filling all voids between the threads.

13. An article comprising at least one reinforcement assembly as in claim 1.

14. A pneumatic tire comprising at least one reinforcement assembly as in claim 1.

15. A pneumatic tire as in claim 14 in which the reinforcement assembly is embodied in the crown of the pneumatic tire.

* * * * *

UNITED STATES PATENT AND TRADEMARK OFFICE
CERTIFICATE OF CORRECTION

PATENT NO. : 4,709,544

DATED : December 1, 1987

INVENTOR(S) : Jean-Louis Charvet

It is certified that error appears in the above-identified patent and that said Letters Patent is hereby corrected as shown below:

Col. 3, line 60, "$|Pa_2|$" should read -- $|Pa_3|$ --. Col. 4, line 8, "lenght" should read -- length --; bridging lines 11 and 12, "linear" should read -- rectilinear --. Col. 7, line 68, "shoped" should read -- shaped --.

Signed and Sealed this

Seventh Day of June, 1988

Attest:

DONALD J. QUIGG

Attesting Officer

Commissioner of Patents and Trademarks